(12) United States Patent
Blomgren (10) Patent No.: US 6,758,481 B2
(45) Date of Patent: Jul. 6, 2004

(54) GOLF BAG CARRIER

(76) Inventor: Hans Blomgren, Rostvägen 8, SE-462 60 Vänersborg (SE)

(*) Notice: Subject to any disclaimer, the term of this patent is extended or adjusted under 35 U.S.C. 154(b) by 9 days.

(21) Appl. No.: 10/182,031

(22) PCT Filed: Jan. 22, 2001

(86) PCT No.: PCT/SE01/00106
§ 371 (c)(1),
(2), (4) Date: Oct. 22, 2002

(87) PCT Pub. No.: WO01/52951
PCT Pub. Date: Jul. 26, 2001

(65) Prior Publication Data
US 2003/0127814 A1 Jul. 10, 2003

(30) Foreign Application Priority Data
Jan. 21, 2000 (SE) .............................................. 0000192

(51) Int. Cl.[7] .................................................. B26B 1/00
(52) U.S. Cl. ................ 280/47.26; 280/652; 280/DIG. 6
(58) Field of Search ............................... 280/47.26, 30, 280/645, 651, 652, 655, 47.18, 47.24, DIG. 6, 47.17, 646, 654, 659, 35, 47.22; 206/315.3, 315.5, 315.7

(56) References Cited

U.S. PATENT DOCUMENTS

| | | | | |
|---|---|---|---|---|
| 2,428,954 A | * | 10/1947 | Apblett et al. ................ 280/40 |
| 2,687,895 A | * | 8/1954 | Rutledge ................ 280/47.26 |
| 2,717,785 A | * | 9/1955 | Ray ............................ 280/646 |
| 2,756,064 A | * | 7/1956 | Rutledge .................... 280/646 |
| 3,620,546 A | * | 11/1971 | Andersen ..................... 280/40 |
| 4,340,236 A | * | 7/1982 | Seibold et al. ................ 280/38 |
| 4,398,736 A | * | 8/1983 | De Wijn ..................... 280/40 |
| 4,506,897 A | * | 3/1985 | Libit ............................ 280/40 |
| 4,648,612 A | * | 3/1987 | Park ........................ 280/47.26 |
| 4,735,425 A | * | 4/1988 | Hoff ......................... 280/47.18 |
| 4,784,401 A | * | 11/1988 | Raguet ......................... 280/40 |
| 4,792,152 A | * | 12/1988 | Carolan .................... 280/47.26 |
| 4,832,362 A | * | 5/1989 | Chen .......................... 280/645 |
| 5,029,883 A | * | 7/1991 | Derito ......................... 280/35 |
| 5,435,546 A | * | 7/1995 | Rao ........................... 224/274 |
| 5,454,576 A | * | 10/1995 | Pitkanen ..................... 280/42 |
| 5,470,095 A | * | 11/1995 | Bridges ..................... 280/646 |
| 5,478,097 A | * | 12/1995 | Forma .................... 280/47.26 |
| 6,007,031 A | * | 12/1999 | Tang ........................... 248/96 |
| 6,425,589 B1 | * | 7/2002 | Wu ............................ 280/30 |
| 6,460,867 B2 | * | 10/2002 | Sciulli .................... 280/47.26 |
| 6,561,527 B2 | * | 5/2003 | Spadino .................. 280/47.26 |
| 6,598,889 B1 | * | 7/2003 | Su ........................... 280/47.26 |
| 6,641,228 B2 | * | 11/2003 | Liu ....................... 301/111.06 |
| 2002/0185844 A1 | * | 12/2002 | Gregory .................... 280/652 |

* cited by examiner

*Primary Examiner*—Brian L. Johnson
*Assistant Examiner*—J. Allen Shriver
(74) *Attorney, Agent, or Firm*—Rolf Fasth; Fasth Law Offices (57) ABSTRACT

A carrier, especially for storage and transport of golf clubs including one or several bags, a wheel frame and a handle, which are preferably made of aluminum, wherein a removable wheel frame (8), supporting the bag(s) (4,21) from an elongated back element (1), is mounted to the lower portion of the back element (1), and that a removably handle (6) is mounted on the upper portion of the back element (1), the wheel frame has the shape of a U turning downwards, which at the web (9) of the U is removably mounted to the back element (1), and that the transitions between the web (9) of the wheel frame and the legs (10,11) are designed with a radius (R) corresponding to half the diameter (D) of the wheels, characterized in a cross bar (16), which is provide on the wheel frame (8), and which extends from one leg (10) to the other leg (11), which cross bar is provided with one or several support means (17), so that the wheels in dismounted condition may be clamped between the transitions and the support pins (17).

10 Claims, 9 Drawing Sheets

GOLF BAG CARRIER

This application is a U.S. national phase application based upon International Application No. PCT/SE01/00106, filed JAN 22, 2001; which claims priority from Swedish Application No. 0000192-5, filed Jan. 21, 2000.

TECHNICAL FIELD

The present invention relates to a carrier, especially such one which is suitable for storage and transport of golf clubs but which also may be used for transport and storage of other objects.

1. Prior Art

Carriers of the above mentioned type are widely known and they exist in a great number of variations. They are especially used at golf games, when one has to transport a number of clubs which may be unsuitable to carry because of their weight and their great number. Therefore, the carriers are provided with wheels of a light construction, they comprise an elongated bag which is intended to accommodate the golf clubs, and they also have a handle of some type, by which they can be brought. It is common that the wheels are rotatably mounted on some type of a frame, which in turn supports the bag itself and the handle.

2. Technical Problem

It is not always necessary to bring a great number of clubs on the golf course, and therefore it may be suitable to have a lighter bag for one or a few clubs. A carrier of the conventional type is then often unnecessarily heavy and troublesome to bring for the transport of only one or some clubs. However, most conventional golf carriers are manufactured in such a way that one has to bring the whole carrier even if you only have a few clubs, which would be easy to carry. Therefore, for a long time there has been a desire that one should be able to convert a golf carrier into a golf bag only. Preferably, this could be made in a flexible manner, so that wheels, handle etc may be mounted/dismounted at the desired occasions independent of other peripherals, or alternative may be left at the starting point, e.g. in the car.

So far, known attempts to obtain such a solution has failed to solve the problem in a satisfactory way. A general problem is that known solutions do not provide the desired space for the golf clubs popping up from the bag. Further, they suffer from additional problems, which are probably of importance for the lack of commercial success. Through e.g. GB 762,002 a carrier is previously known for storage and transport of golf clubs, a wheel frame and a handle, wherein one from an elongated back element removable wheel frame is mounted on the lower portion of the back element, a handle is mounted on the upper portion of the back element, the wheel frame has the shape of a U turned downwards, which frame at the web of the U is removably mounted to the back element, and that the transitions between the wheel frame and the legs are designed with a radius (R) corresponding to half the diameter (D) of the wheels, so that the wheels may be kept within the wheel frame. However, said known solution has strength problems because of weakness at the mounting point, which can be subject to heavy forces during use. Further, the securing of the wheels in storage position is based on the wheels being elastic and compressible, which normally is not the case for wheels of today's golf carriers. Moreover, it shows an expensive solution for the mounting of the wheels on the wheel frame in an active position. Another solution is known through U.S. Pat. No. 4,792,152, which shows the essential drawback that the wheels and the wheel frame cannot be stored in an integral and compressed manner. Further, the construction seems to be clumsy, especially as the storage of the wheels lengthens the lower portion of the bag.

3. Solution

An objective of the present invention is to eliminate, or at least minimize, one or some of the above mentioned problems, which is achieved with a carrier, especially intended for storage and transport of golf clubs, including one or several bags, a wheel frame and a handle, which are preferably made of aluminium, wherein a removable wheel frame supporting the bag/s from an elongated back element is mounted to the lower portion of the back element, ad a removable handle is mounted to the upper portion of the back element, the wheel frame has the shape of a U turning downwards, which at the web of the U is removably mounted to the back element, and the transitions between the web of the wheel frame and the legs are designed with a radius (R) corresponding to half the diameter (D) of the wheels, characterised in a cross bar which is provided on the wheel frame and which extends from one leg to the other, which cross bar is provided with one or several support means, so that the wheels in dismounted condition may be clamped between the transitions and the support pins.

According to further aspects of the invention:

the handle is provided with a bent portion, which bends out away from the bag to achieve a large space for the clubs or the like popping up from the bag;

edge means are provided in the transitions between the web and the legs;

that the wheel frame is removably mounted to the back element through a male portion and a female portion, respectively, which may be secured into each other by locking means, preferably a manually influencible quick-acting locking means, which may be locked without using any tools, wherein the wheel frame preferably has a recess at the outer side of the web to accommodate a flat element mounted on the lower portion of the back element, as well as a manually turnable locking screw, which is accessible from the inside of the wheel frame, for locking of the recess to the flat element;

the bag has a back carcase, which is provided with a leg stand;

a socket, which is provided at the upper portion of the back element, for accommodation of the lower insertable portion of the handle;

a locking device, which may be manually activated, for the connection of the handle to the back element, wherein the handle bends out from the bag above the locking screw in order to establish a larger space for the clubs popping up from the bag;

attachment means for removable or fixed mounting of a bag are arranged at upper and lower ends of the back element, preferably the lower fastening means being arranged adjacent to the bottom portion of the bag;

one or several removable deposit pocket/s is/are attached to the bag; and one of the removable deposit pockets is sized to accommodate the wheel frame with dismounted wheels as well as the handle portion, and that it preferably is intended for mounting on top of a deposit pocket, which is fixedly attached to the bag.

DESCRIPTION OF DRAWINGS

Below, the invention will be described more in detail with reference to the accompanying drawing, of which.

DETAILED DESCRIPTION OF DRAWINGS

Figure 1:
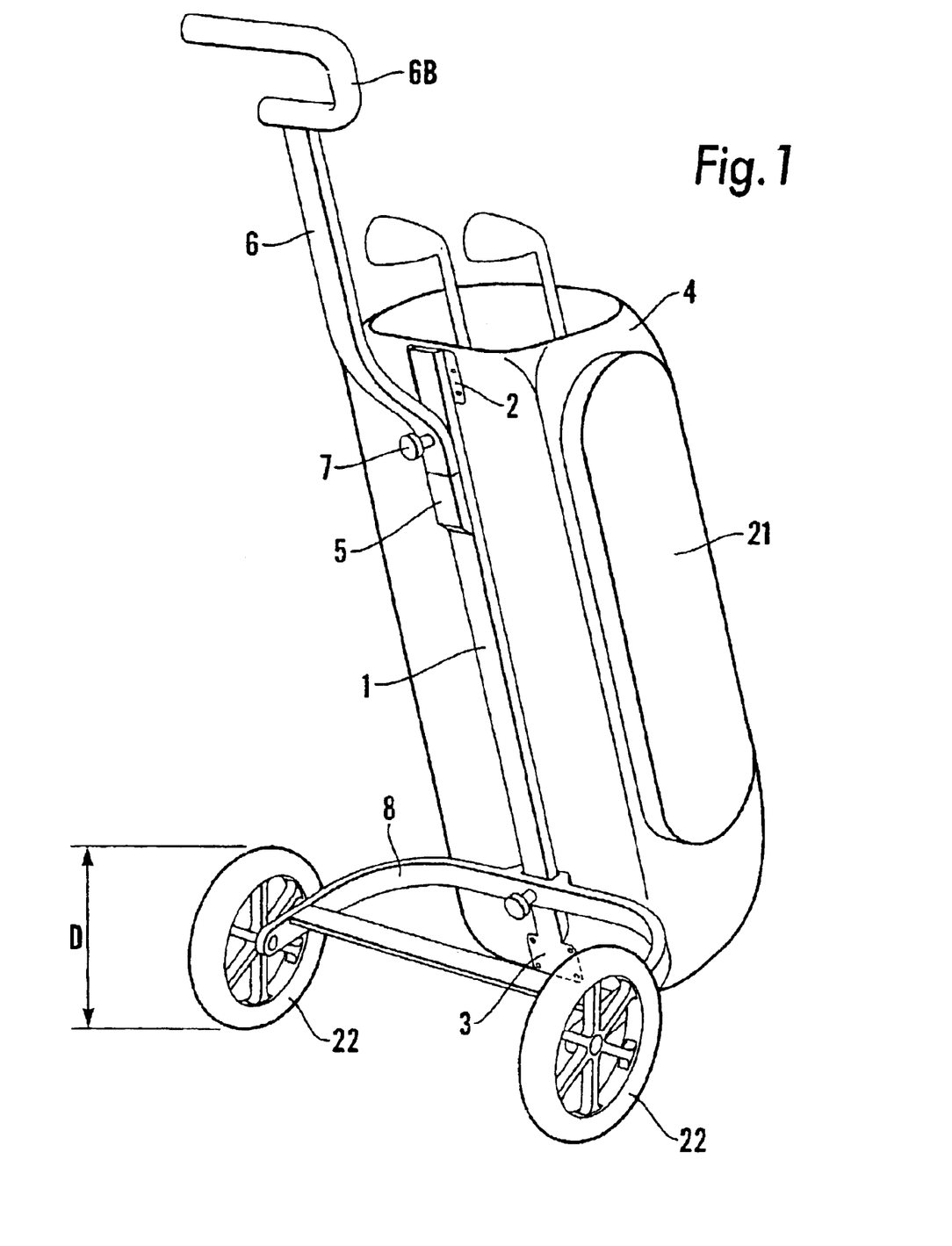
FIG. 1 in a perspective view shows a first embodiment of the carrier according to the present invention with a bag.

FIG. 1 shows a perspective view of a golf carrier according to the present invention. The carrier comprises a back element (1) having an elongated and narrow shape. Said element may consist of a flat bar or a square tube of steel, but it may also as well be made of a lighter material such as any aluminium alloy. Fastening means (2, 3) for permanent attachment (for instance by rivets) of a golf bag (4) are provided on the back element. The back element (1) is also provided with a socket/female portion (5) for insertion therein of a male portion (6A) of a handle (6) with a gripping portion (6B). The handle (6) is provided with a quick-acting locking device in the form of a manually turnable locking screw (7), which above the socket (5) may lock the handle (6) to the back element (1), i.e. by interaction by the locking screw with a threaded hole (19) in the back element (1).

A wheel frame (8) is removably mounted to the back element (1) at the lower portion of said back element (1). As can be seen from the figure, said wheel frame is U-shaped, and in the region of the web of the U it is removably attached to the back element (1), while each of the two legs of the U supports a wheel (22) each, which is suitably provided with bearings, preferably a ball/roll bearing, the wheel axis rotating within the wheel, so that the wheel axis may be secured, not rotatably, to the wheel frame. The wheels (22) are suitably covered by an outer wear surface, e.g. of rubber or plastics, which preferably does not require any pressurisation with a medium (as for instance is known through GB 762,002, according to which compressed air must be used inside the wheel cover).

Figure 2:
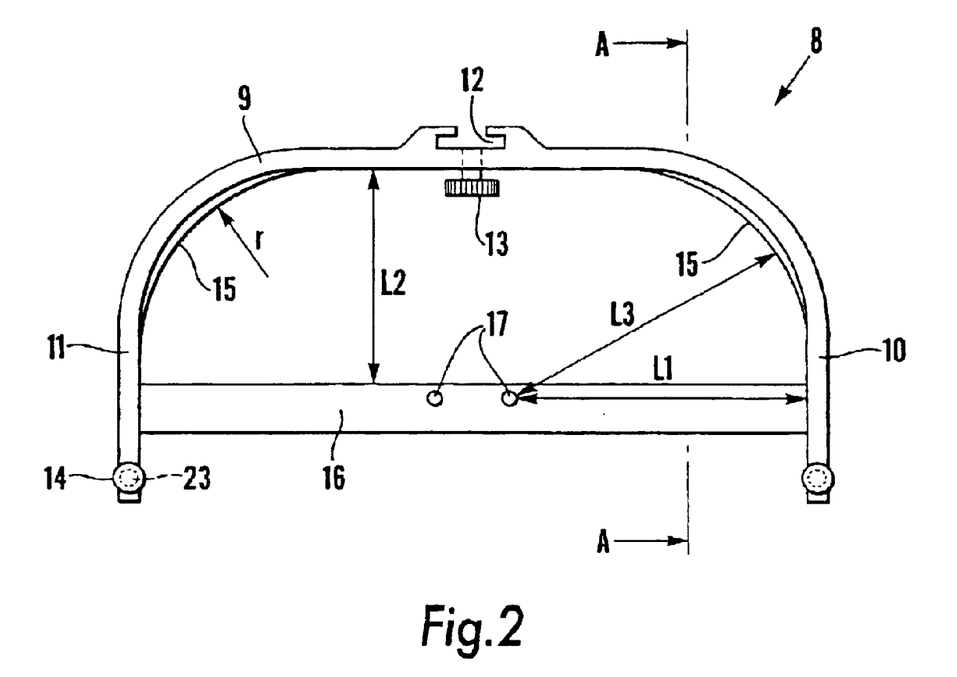
FIG. 2 shows the wheel frame, in a view from above.

In FIG. 2 the U-shaped wheel frame (8) with its web portion (9) is shown, as well as the two legs. On the outer side of the web portion (9) a recess (12) is made, which will serve as a female portion, which will cooperate with a male portion of the back element (1). Said female portion shall in a direction of movement coinciding with the longitudinal extension of the back element be pulled over the male portion (18) of the back element (1). In the lower edge of the male portion (18) stop lugs (20) are provided on both sides of the back element (1), which stop lugs prevent the wheel frame to move downwards. Alternatively, the male portion and the female portion may be wedge-shaped in the similar way, so that exact match is obtained when the wheel frame (8) has been pulled over the male portion of the back element down to the desired position.

However, also when wedge-shaped, stop lugs may be used. A quick-acting locking in the form of a manually turnable och easily accessible through-screw (13) serves for locking the wheel frame (8) to the back element (1), and the stop lugs and/or the wedge-shape ensures that the wheel frame cannot be moved downwards during use. Near the lower end of the legs (10, 11) there are through-holes (14). These ones shall be used for passage and attachment of the wheel axes, which like the wheel frame (8) and the handle may be fixedly mounted to the wheel frame through a locking mechanism, which is easy to activate and inactive. According to the shown embodiment, screws (23) are used locking the wheel axis to the wheel frame (8), but other locking mechanisms may advantageously be used, for instance such one known for attachment of wheels for baby carriages. Naturally, also slide bearings may be used.

When the wheel frame and the wheels are not to be used, it is suitable that the entire unit may be easily put together and detached. For this purpose, the radius R of the transitions between the web portion (9) and the legs (10, 11) is essentially as large as half the diameter D of the periphery of the wheels. Further, an edge means (15) is provided in the lower edge of the transitions between the web portion (8) and the legs (10, 11). Said edge portions (15) or flanges are intended to give support to the wheels, when they have been screwed away and placed into the wheel frame (8). To easily achieve this condition, a cross bar (16) is provided between the legs (10, 11), which should be placed within the wheel diameter D in relation to the inner edge (9A) of the web (9), and there are also support pins (17) on said cross bar (16). Said support pins are preferably two and are placed at a distance L from said transition, which essentially corresponds to the diameter D of the wheel, but also only one support pin (17) may be used, if its size is adapted (is made larger), so that its side surfaces serve the same function. (See FIG. 5). Because of the rubber coating the wheels can be safely clamped between the support pin (17) and transition, while the wheel rests against the edge/flange (15) and the cross bar (16).

Figure 3A:
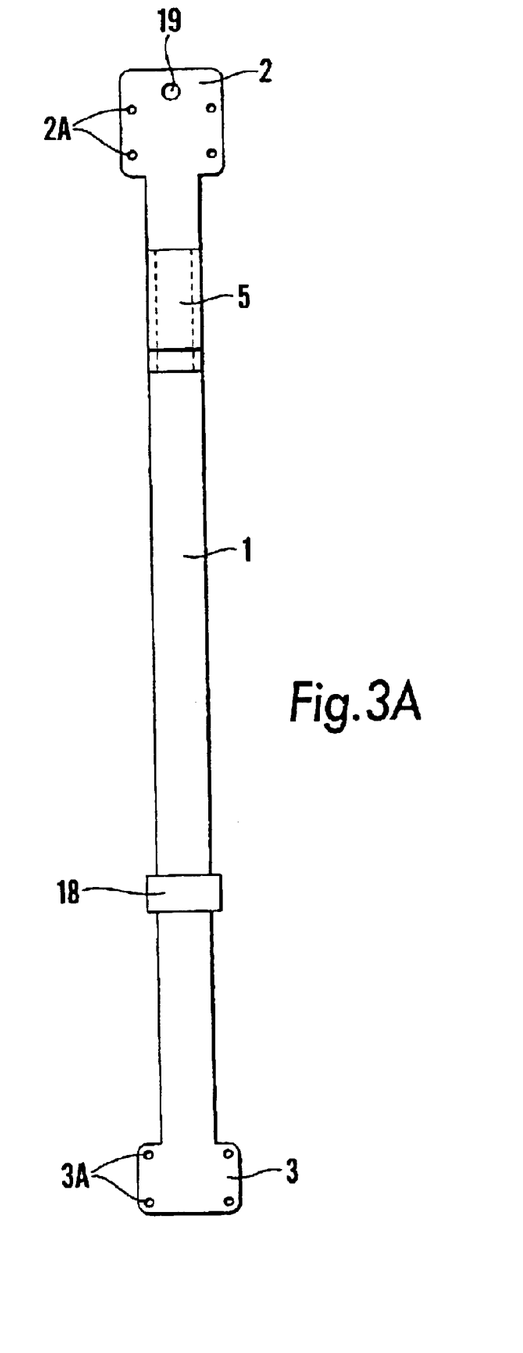
FIG. 3A shows a front view of the back element according to FIG. 1.
Figure 3B:
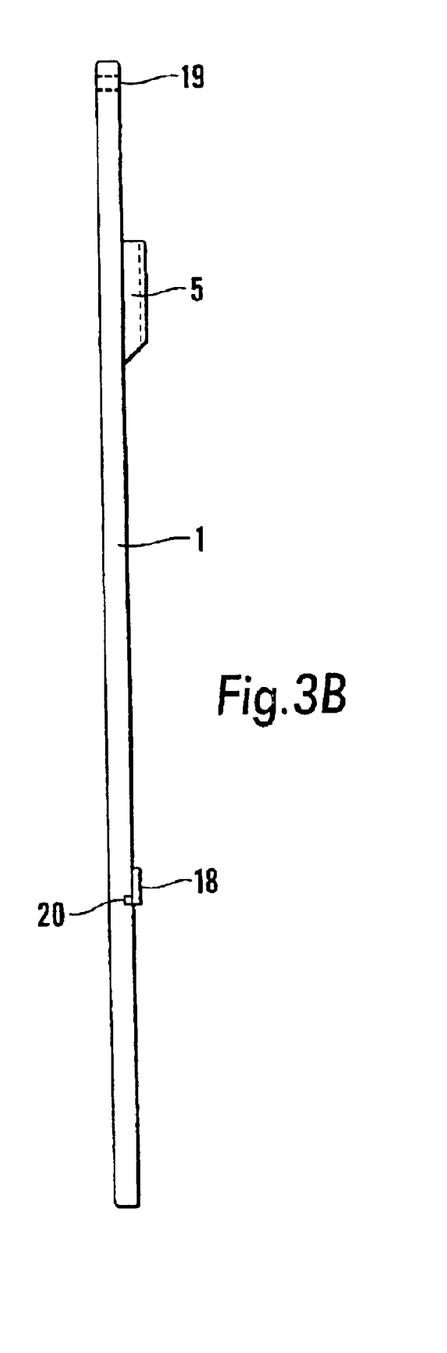
FIG. 3B shows a side view of the back element according to FIG. 1.

FIG. 3A shows a front view of the back element, and FIG. 3B shows it in a side view, wherein it in its two ends is provided with attachment means (2,3). At its lower portion the back element is provided with a male portion (18), over which the female portion (12) of the wheel frame (8) is pulled. The male portion (18) suitably consists of a sheet which is welded on the back element (1), which sheet preferably is narrowing in a direction away from the stop lugs (20), so that it easily fit in the recess or the female portion (12) of the wheel frame (8), when pulled over from above. It is advantageous that the pull-on procedure is performed in this direction, as the forces arising via the wheel when the carrier is drawn over hindrances then act in the locking direction (in the case of a wedge-shape) and/or against the stop lugs (20), so that a safe locking is achieved. The socket (5) is placed at the upper portion of the back element (1), which socket is intended for the accommodation of the lower insertable part of the handle (6). In order not to obtain too large breaking forces in the transition between the socket (5) and the handle (6) it is of great advantage to arrange the locking recesses (for instance a thread) for the locking screw (7) at a long distance from the upper edge of the socket, suitably about 10 cm.

Figure 4:
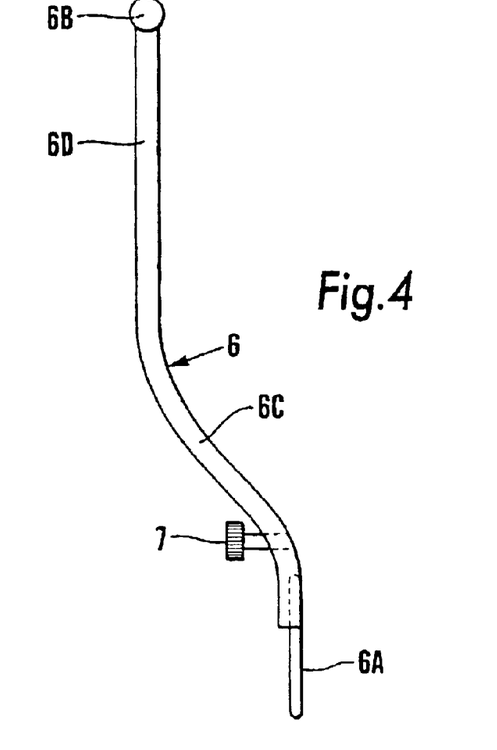
FIG. 4 shows the handle in dismounted condition.

FIG. 4 shows the handle (6), which at its lower portion of the male portion 6A has a tip-shaped design. This design is made so that it should be easy to insert the handle (6) into the socket (5) of the back element (1). To lock the handle (6) there is a manually turnable locking screw (7) above the insert portion (6A). The handle (6) is also bent slightly outwards from the back element (1) by having a first, essentially straight portion in the same plane as the male portion (6A), a curved portion (6C) bending outwards away from the back element (1) in the same direction as the screw (7), and a second, essentially straight portion (6D), which is essentially parallel to but with a displacement of at least 10 cm relative said first straight portion. This arrangement has been made so that the handle shall not stand in the way of the clubs or other objects popping up from the bag (4) in this region.

Figure 2A:
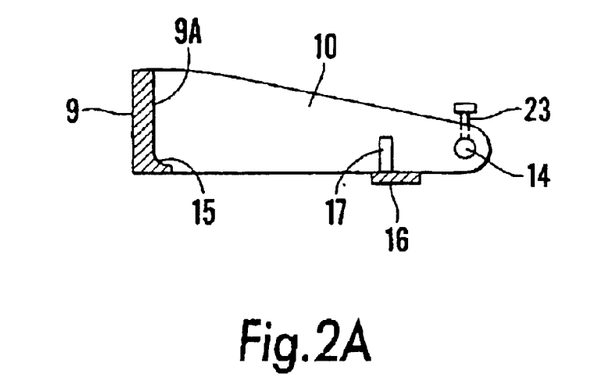
FIG. 2A shows a cross section along the line A—A of FIG. 2
Figure 5:
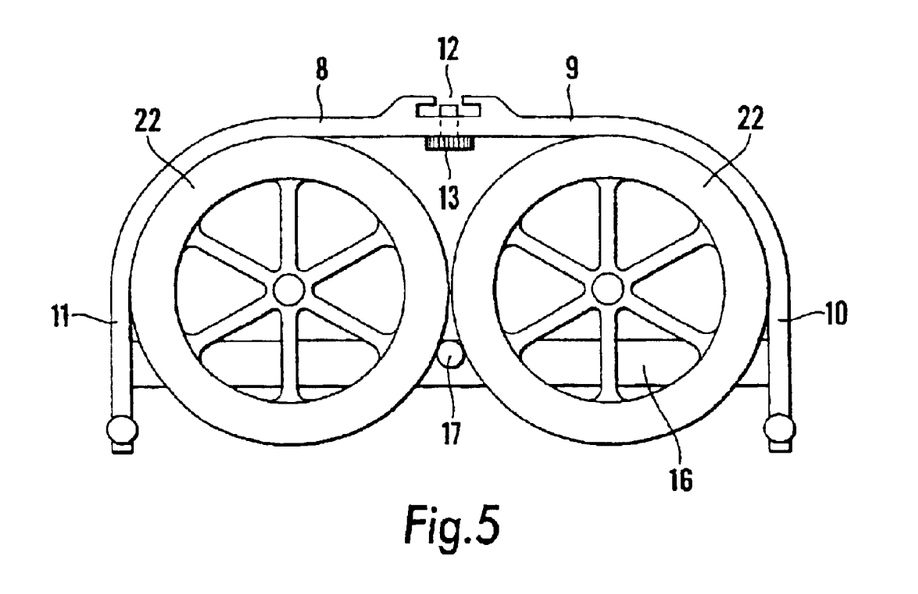
FIG. 5 shows the wheel frame and the wheels in dismounted condition with the wheels clamped within the wheel frame itself.

FIG. 5 shows how the wheels and the wheel frame (8) may be compressed, when these elements are dismounted. As can be seen, the two wheels lie against the rounded transitions between the web (9) and the legs (10, 11) as well as against an adapted support pin (17) on the cross bar (16), so that the wheels are safely clamped. Further, the wheels rest against the edge portions (15) and the cross bar (16), which is thus provided at the bottom edge (see FIG. 2A) of each leg (10, 11), so that the wheels in dismounted condition may be accommodated within the legs.

As can be seen in FIG. 1, a golf bag (4) is fixedly secured on the back element (1). One or several removable pockets/bags (21) may be provided on said main bag (4). According to the invention, one of these pockets (21) is suitably dimensioned in such a way that it can accommodate the wheel frame (8) with wheels and the handle (6), when these details need not be used for the pulling of the carrier. Said pocket may advantageously be removable by a zip fastener or the like, so that it may optionally be carried or left, e.g. in the car. The pocket may possibly have an own handle. Because of the design with the long back element (1), almost as long as the bag, and the insert means (5) for the handle (6) high up the back element, the length of the handle may be made substantially equal to the largest diametrical measure of the wheel frame (8), which implies that said pocket/bag (21) has sizes which are below the length of the golf bag, and hence becomes easier to handle. The golf carrier may thus be converted to a light bag, which mainly consists of the bag (4), which may be provided with suitable carrying means and be carried all over the golf course. The removable pocket/s (21) is/are suitably intended to be mounted on top of a stationary deposit pocket (not shown) of the bag.

Figure 6:
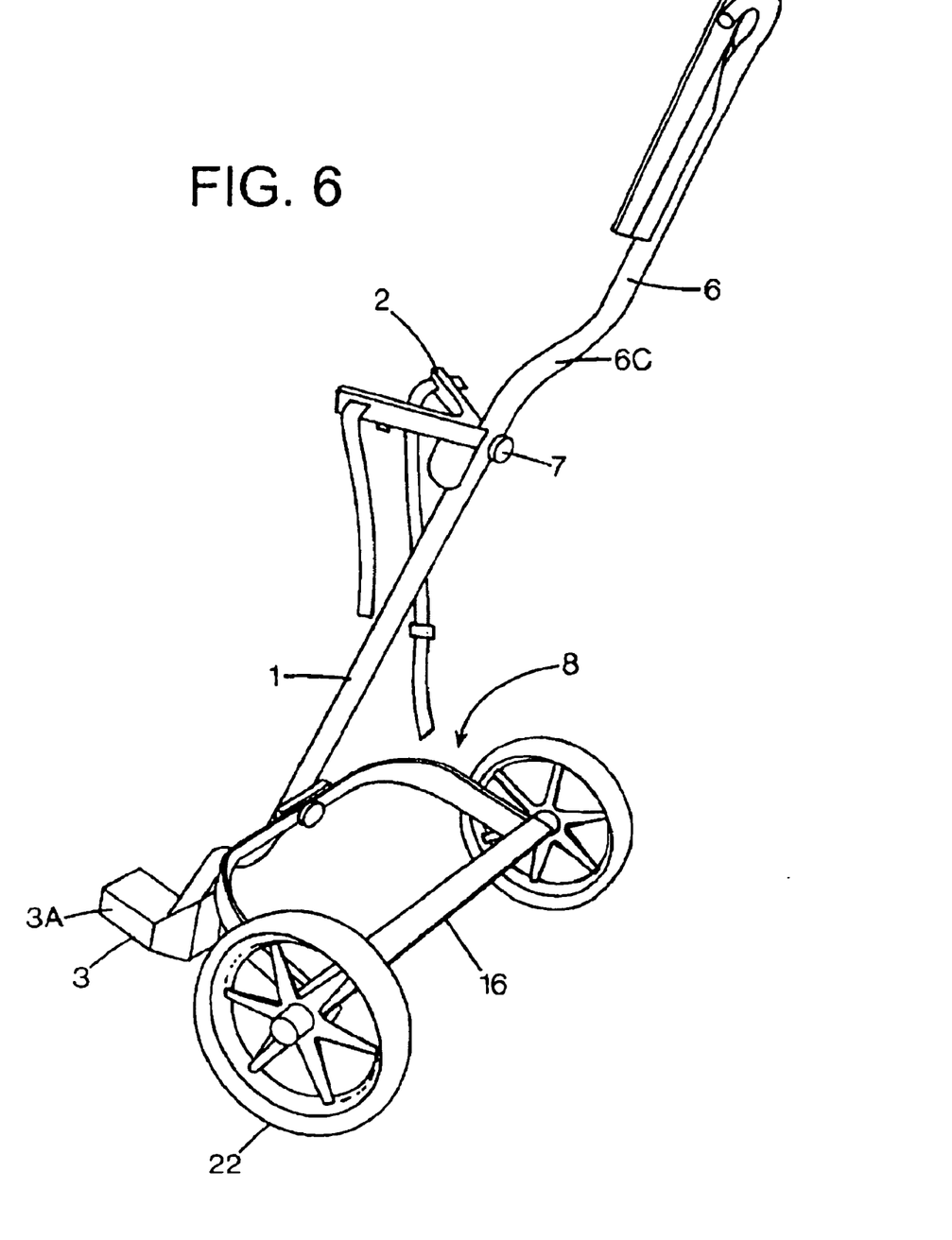
FIG. 6 in a perspective view shows a preferred embodiment of the carrier according to the present invention without any bag.

FIG. 6 a preferred embodiment of a golf carrier according to the present invention is shown. To a great extent, the principles of the design are the same as the one previously shown, and therefore only certain differences will be focused. A difference is that the back element (1) of the carrier (which in this case constitutes of a square tube) is not integrated with the bag (4) but constitutes a separate unit. At the upper, open end of the square tube, a socket (5) is formed, for receiving the male portion of the handle (6), which is locked by a nut (7). The same nut (7) also locks an upper bag attachment means (2), which is removably arranged on the back element (1). The lower bag attachment means (3) is suitably (not necessarily) fixedly mounted to the lower end of the back element (1). The lower attachment means is suitably provided with an essentially horizontal support plate (3A), on which the bag (4) should be placed.

Figure 7:
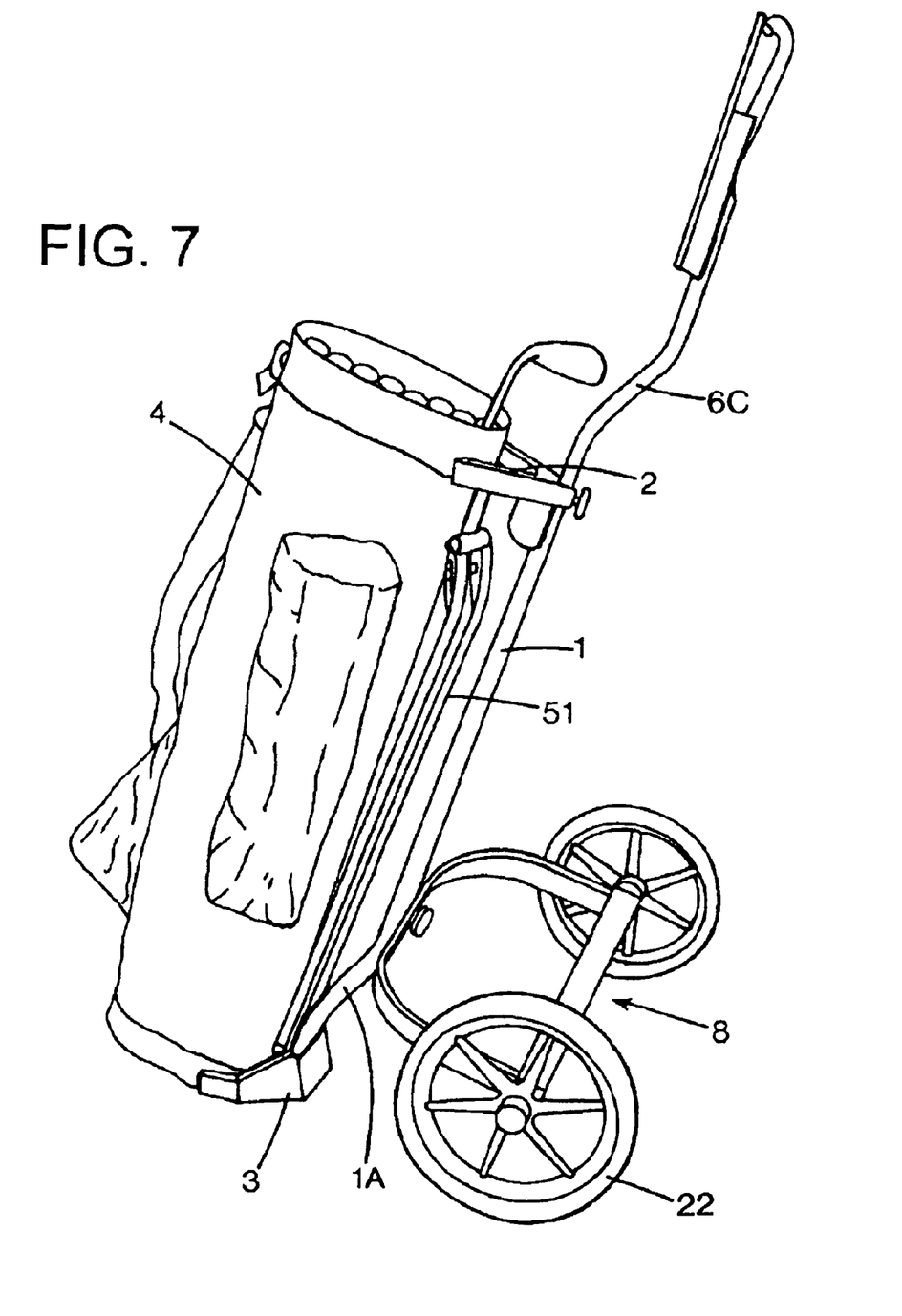
FIG. 7 in a perspective view shows a preferred embodiment of the carrier according to the present invention with a bag provided with an integral support leg.

In FIG. 7 the carrier is shown more from the side and together with a smaller bag. As can be seen from this figures, the lower portion of the back element is provided with a bent portion (1A), which bends outwards in the opposite direction relative to the bent portion (6C) of the handle. The reason for the bent portion (1A) of the back element is to make the carrier spacious enough in order to make it possible to transport a larger bag too. However, the same kind of attachment means (2,3) may be used for both bag sizes.

Figure 8:
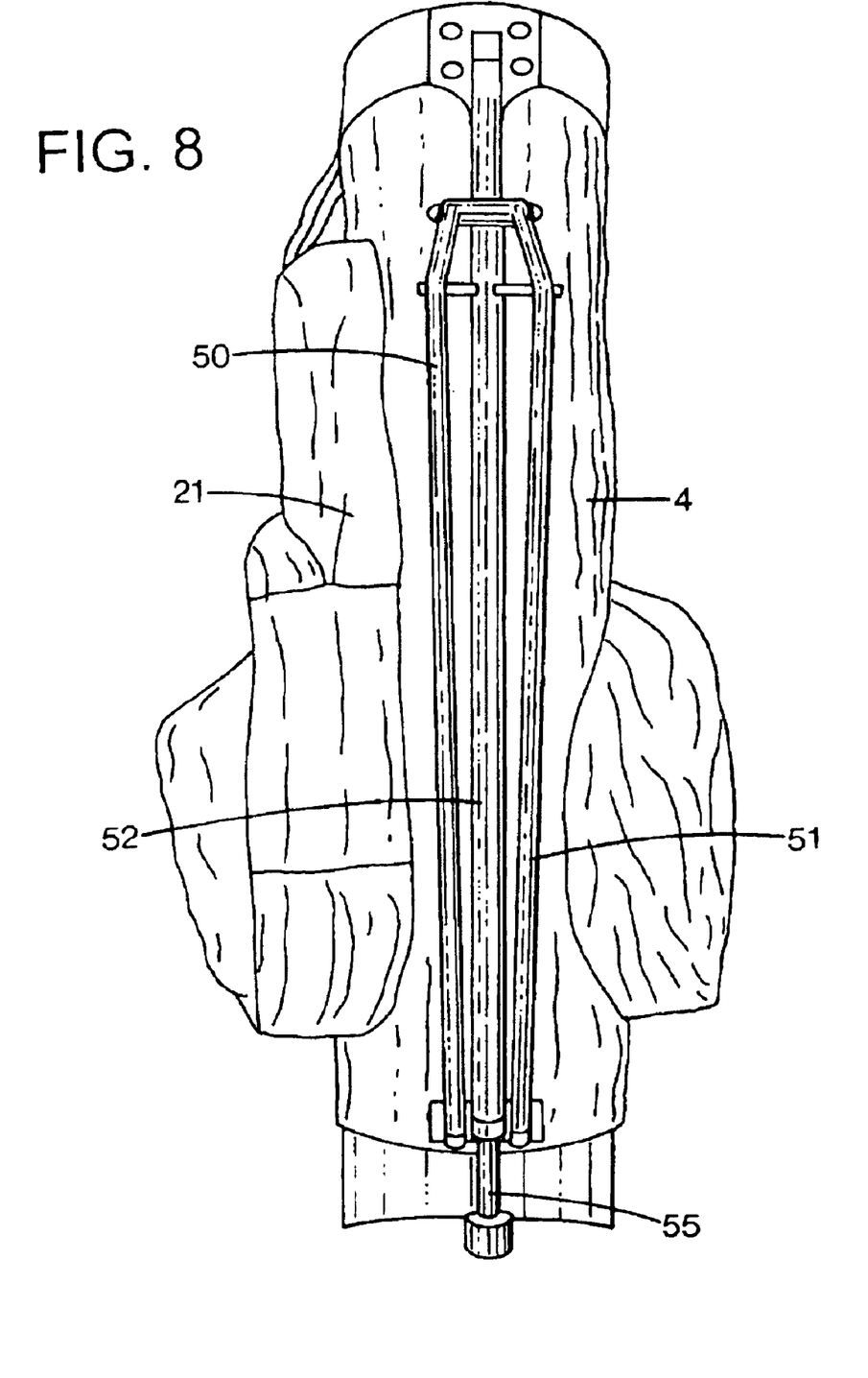
FIG. 8 shows the bag with the support leg, as view from behind.
Figure 9:
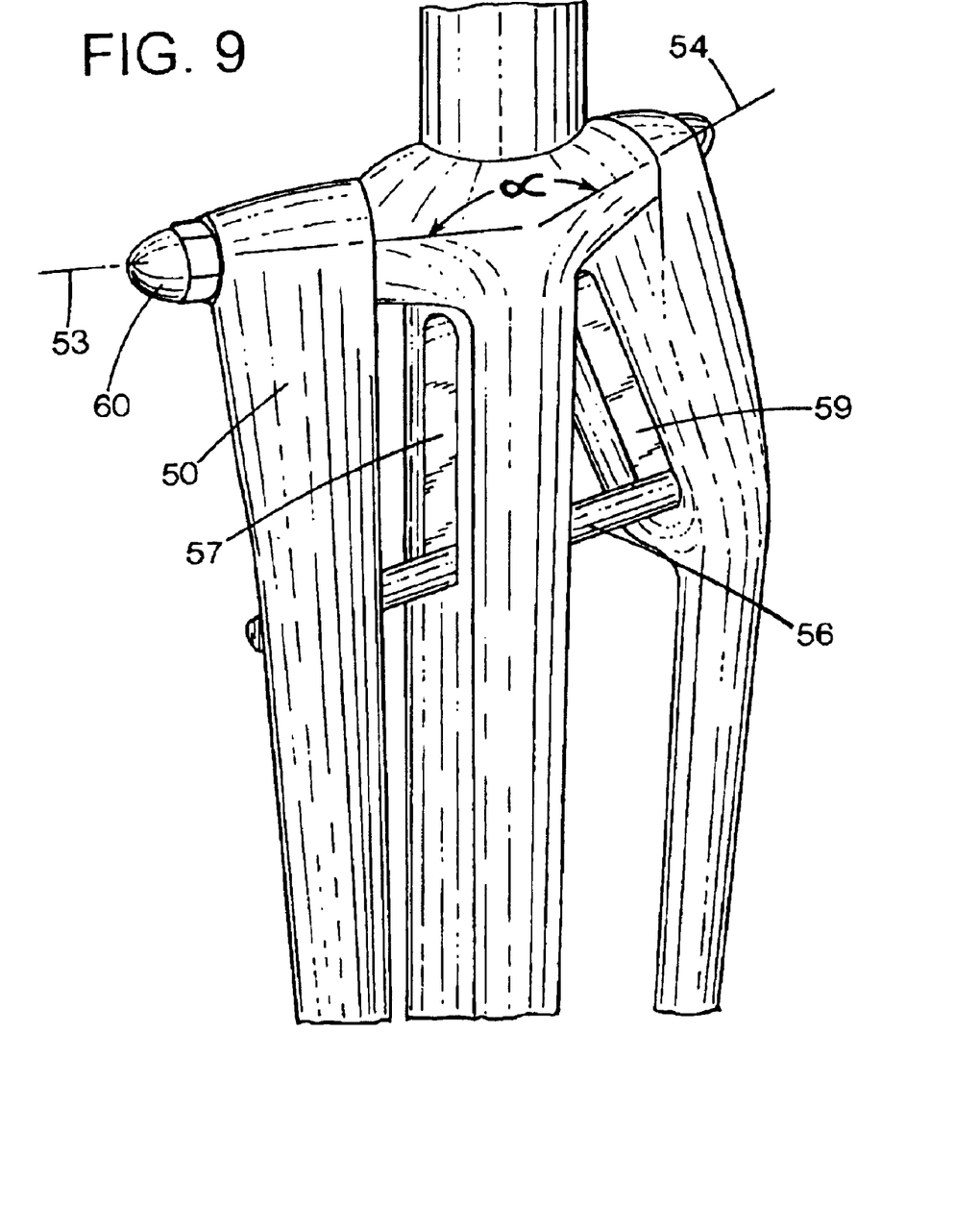
FIG. 9 shows the attachment of the support legs in folded condition.
Figure 10:
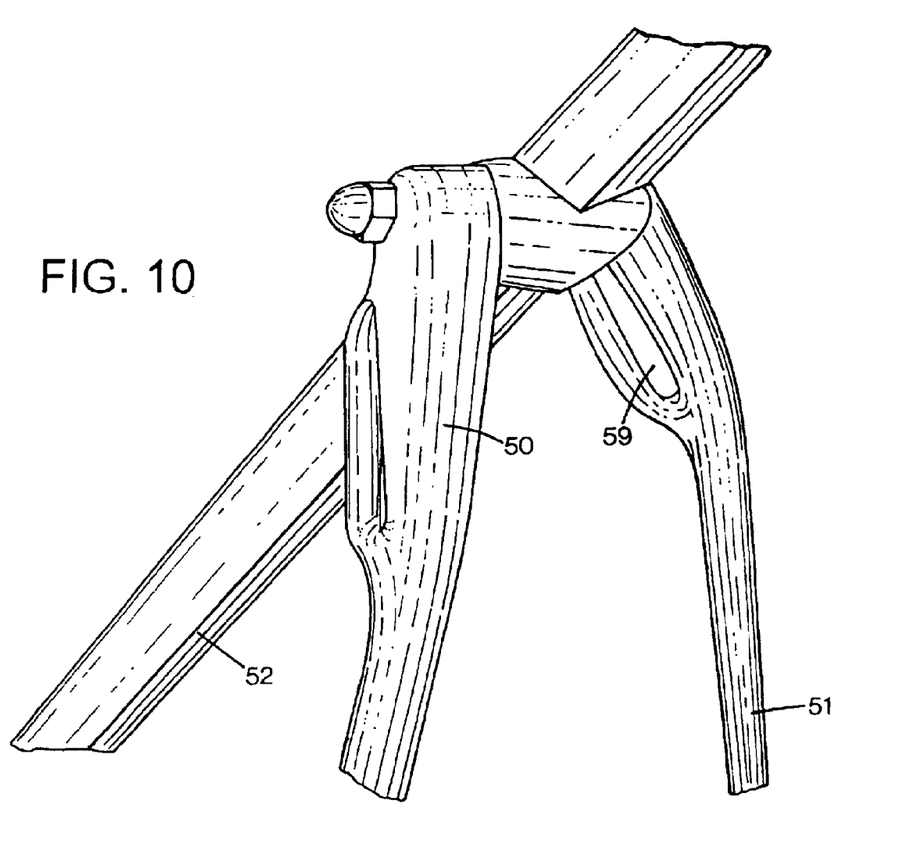
FIG. 10 shows the attachment of the support legs in unfold condition.

In FIG. 8 there is shown, that a back carcase (50), attached to the bag, may be provided with a leg stand (51, 52) supporting the bag (4), when the wheel frame and the handle have been removed and possibly placed in a pocket (21). Such a leg stand may be provided in an easy way thanks to the invention (as can be send from FIG. 1). Each leg (51, 52) is pivotably suspended about an axis (52, 53) (see FIG. 9), which is arranged in the same, substantially horizontal plane but at a certain angle α relative to each other. Because of said angular adjustment of the axes (53, 54), the legs will be able to swing outwards from a collapsed, essentially parallel position (see FIG. 8) to an unfolded position, wherein the ends of the legs are positioned far from each other, so that the bag may stay steadily. A spring loaded mechanism sees to it that the legs (51, 52) aim at swinging inwards against their collapsed position. Said mechanism consists of a bar (55), which runs within the back carcase (50). At the top, the bar (55) is provided with a tie rod (56) extending on each side of the back carcase through slots (57), which are arranged in the longitudinal direction. The tie rods (56) interact with the slots (59) in each leg (51, 52). At the other end of the bar there is a pressure means (58) intended to be influenced by pressing the bag (4) against the ground. During such an action, the bar (55) will by the spring forces be disposed in the back carcase (50), wherein the tie bar (56) moves upwards through the slots (57) and at the same time up into the slots (59) in the respective leg (51, 52), so that the legs swing outwards to the extended position shown in FIG. 10. The legs are suitably secured at respective axis (53, 54) by the locking) nut (60).

The invention is not limited to the embodiment shown above but may be varied in different ways within the scope of the patent claims. For instance, it is appreciated that the attachment means (2, 3) may be varied in many obvious manners. Further, it is realized that the wheel frame may deviate somewhat from a clear U-shape but still have the advantages according to the invention, for instance through providing an additional bar running parallelly to and halfway between the legs (10, 11), wherein a M-shape could be seen. But also with such a variant, it is realized that the outer outlines show the U-shape, which implies advantageous synergies. Further, it should be understood that the male portion and the female portions may change places both for the handle portion and the wheel frame portion. Additionally, it is obvious that other locking, means than screws (7, 13), such as e.g. snap attachments, may be used to fixedly mount the female and male portions into each other. It is realized, that the back element may be manufactured in many different ways, for instance through welding the structure of both the flat iron and the steel tube, or to have an extruded carcase, e.g. of aluminium, which is then completed/machined, with known methods per se (welding, drawing, cutting, screw joints, etc) to the final shape. It is suitable that the back element (1) forms a structure which may be well integrated/compressed (not too heavy, not too bulky) with the bag, and that it has an essential length, preferably between about 60–100% of the length of the bag, but more preferred at least about 70%. Further, it is realized that different kinds of configurations may be utilized to obtain the desired function of the support means (17) for securing the wheels (22) in compact condition. Finally, it should be realized that many of the above described components, e.g. the leg stand (51, 52) may be used independent of the carrier, and that the different parts of the carrier may advantageously be manufactured as module units, so that the customer at will may choose if he for instance wants a bag (4) with back element/carcase according to FIGS. 1–3 and a leg stand (51, 52) according to FIGS. 8–10, wherein the back carcase then also has a socket for the handle (in such an embodiment the back element will thus be synonymous with the back carcase) and possibly also a carrier with separate back element according to FIGS. 6 and 7.

What is claimed is:

1. A carrier for storage and transport of golf clubs, comprising:
    a bag, a removable wheel frame and a removable handle the wheel frame supporting the bag mounted to a lower portion of an elongated back element,
    the handle being mounted to an upper portion of the back element (1),
    the wheel frame having a shape of a downwardly turned U, the wheel frame being removably mounted to the back element (1) at a web (9) of the U,
    a transition between the web (9) of the wheel frame and first and second legs (10, 11) being designed with a radius (R) corresponding to half a diameter (D) of wheels (22),
    the wheel frame being provided with a cross bar extending from the first leg (10) to the second leg (11),
    the cross bar being provided with a support, so that the wheels in a dismounted condition are clamped between the transition and the support.

2. A carrier according to claim 1, wherein the handle (6) is provided with a curved portion (6C), which bends outwardly away from the bag to establish a larger space for the clubs popping up from the bag.

3. A carrier according to claim 1, wherein edge means (15) are provided in transitions between the web (9) and the legs (10, 11).

4. A carrier according to claim 1, wherein the wheel frame (8) is removably mounted to the back element (1) through a flat element (18) and a recess (12), respectively, which is secured into each other by locking means (13), which is locked without using any tools, wherein the wheel frame (8) preferably has the recess (12) at the outer side of the web (9) to accommodate the flat element (18) mounted on the lower portion of the back element (1), as well as a manually turnable looking screw (13), which is accessible from the inside of the wheel frame (8), for locking the recess to the flat element (18).

5. A carrier according to claim 1, wherein the bag (4) has a back carcase (50), which is provided with a leg stand (51, 52).

6. A carrier according to claim 1, wherein a socket (5) is arranged on the upper portion of the back element (1) for the accommodation of a lower insertable portion (6A) of the handle.

7. A carrier according to claim 6, wherein a manually activatable locking means (20) for connecting the back element (1) to the handle (6), wherein the handle (6) bends outward from the bag (4) above the locking screw (20) to establish a larger space for the clubs popping up from the bag.

8. A carrier according to claim 7, wherein attachment means (2, 3) are arranged at the upper and lower ends of the back element (1) for removable or fixed mounting of a bag (4), wherein the lower attachment means (3) is provided adjacent to the bottom portion (4A) of the bag.

9. A carrier according to claim 8, wherein one or several removable deposit pockets (21) are attached to the bag (4).

10. A carrier according claim 9, wherein one of the removable deposit pockets is sized to be able to accommodate the wheel frame (8) with dismounted wheels as well as the handle.

* * * * *